Figure 1:
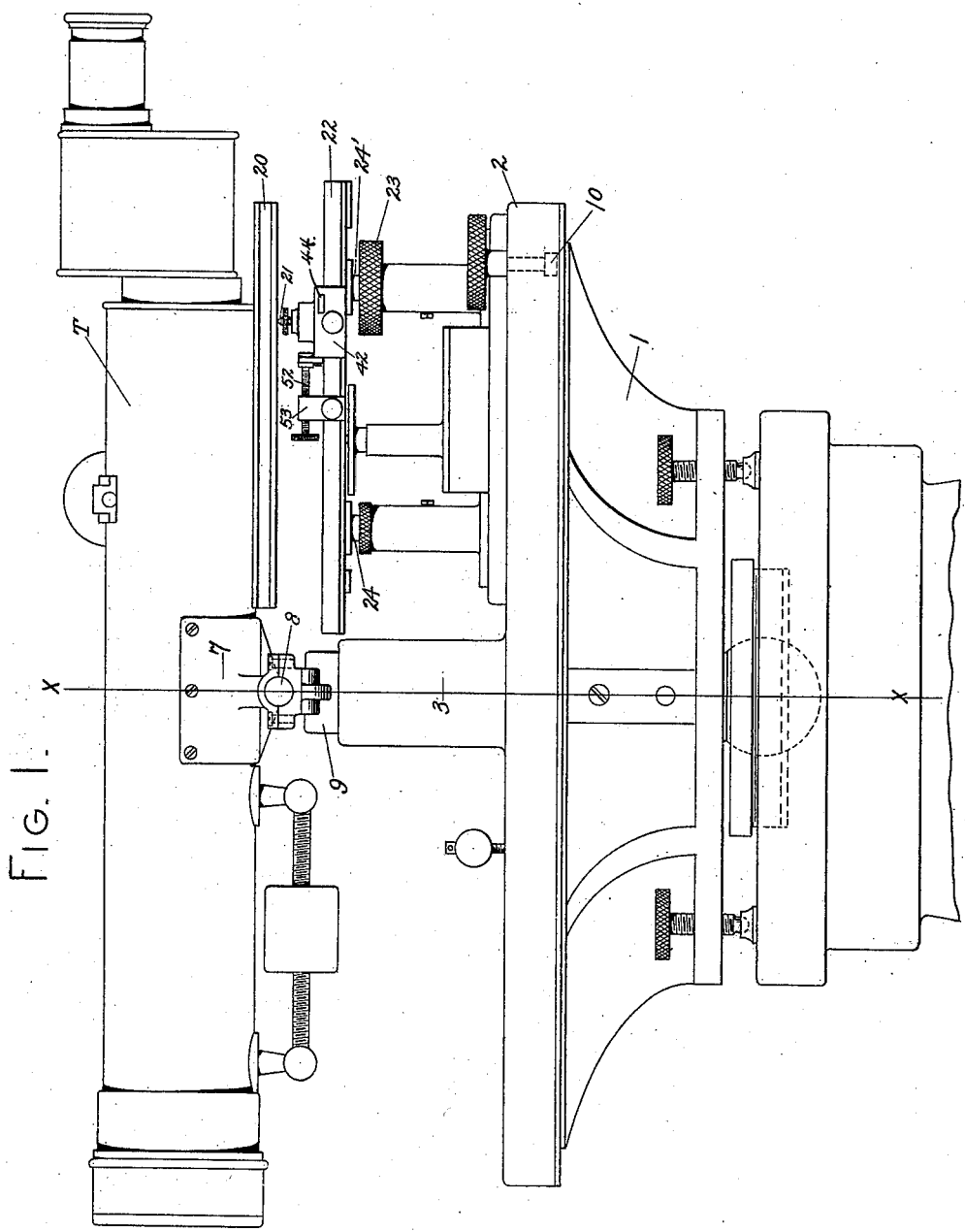

A. W. ERDMAN.
RANGE FINDER.
APPLICATION FILED MAR. 26, 1908.

983,272.

Patented Feb. 7, 1911.
9 SHEETS—SHEET 1.

WITNESSES:
Clifford A. Klos.
H. G. Kimball

INVENTOR:
Albert W. Erdman
By M. Tudor Spencer
HIS ATTORNEY

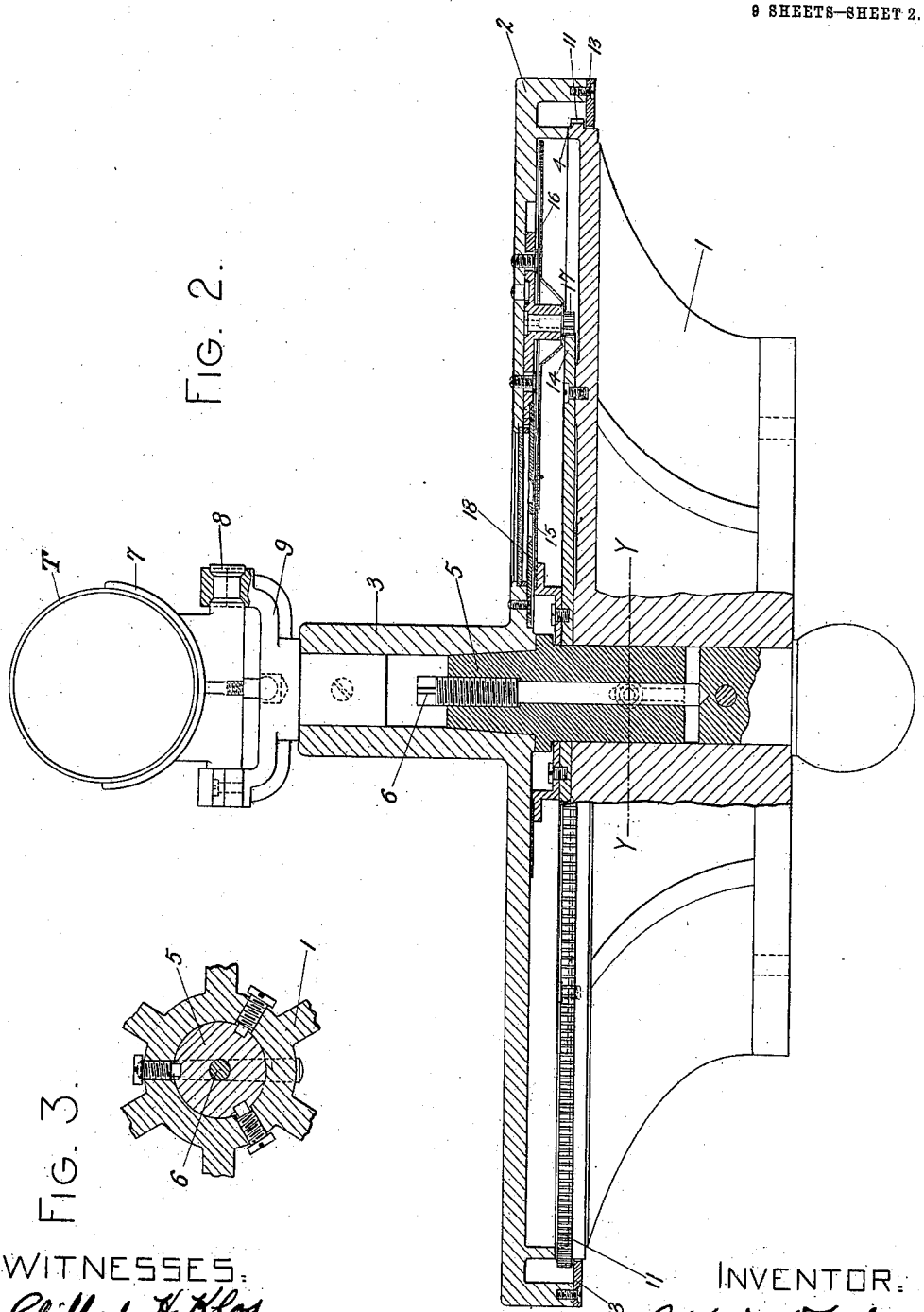

A. W. ERDMAN.
RANGE FINDER.
APPLICATION FILED MAR. 26, 1908.

983,272.

Patented Feb. 7, 1911.
9 SHEETS—SHEET 3.

WITNESSES:
Clifford H. Klos
H. L. Kimball

INVENTOR:
Albert W. Erdman
[signature]
HIS ATTORNEY

A. W. ERDMAN.
RANGE FINDER.
APPLICATION FILED MAR. 26, 1908.

983,272.

Patented Feb. 7, 1911.
9 SHEETS—SHEET 5.

WITNESSES:
Clifford H. Klos.
H. E. Kimball

INVENTOR:
Albert W. Erdman
Norman Spencer
HIS ATTORNEY

THE NORRIS PETERS CO., WASHINGTON, D. C.

A. W. ERDMAN.
RANGE FINDER.
APPLICATION FILED MAR. 26, 1908.
983,272.
Patented Feb. 7, 1911.
9 SHEETS—SHEET 6.
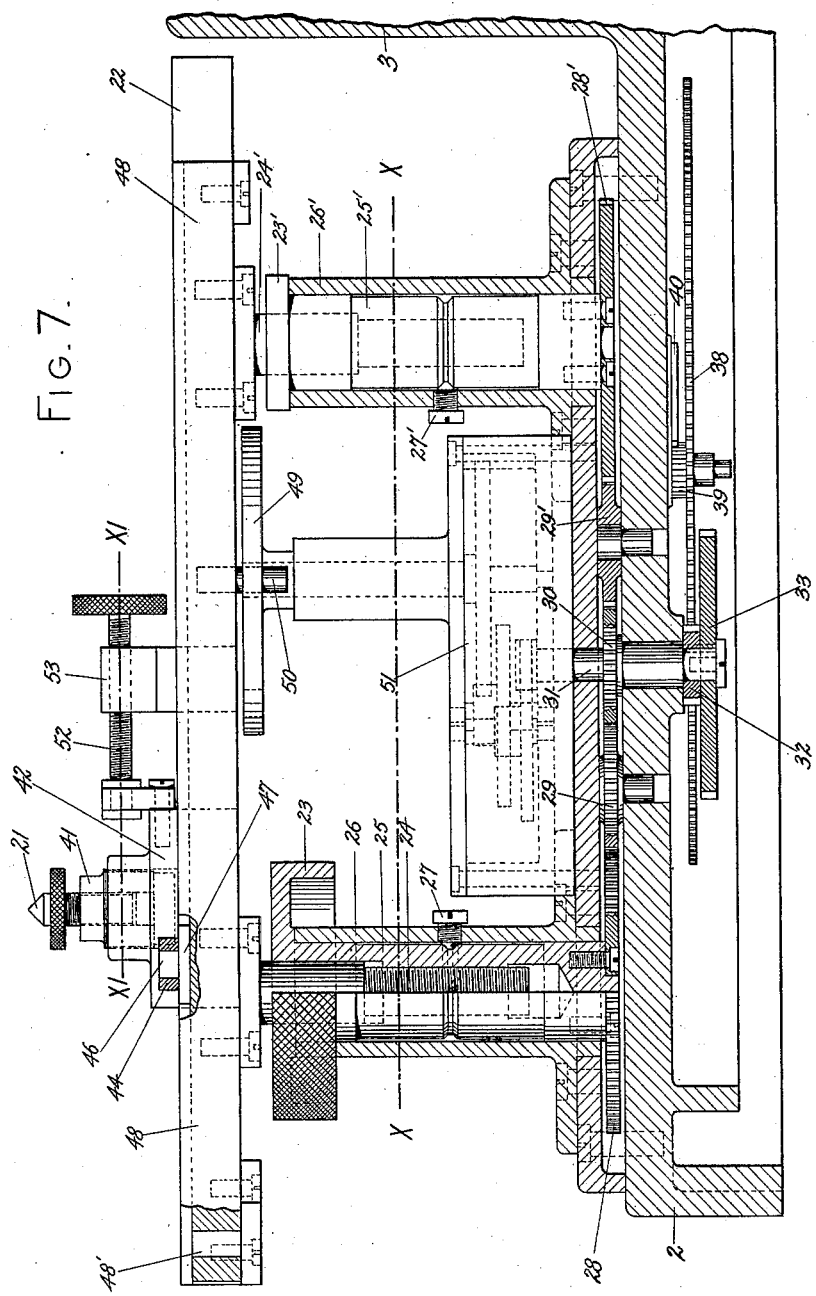
WITNESSES.
Clifford H. Klos.
H. G. Kimball
INVENTOR=
Albert W. Erdman
M. Moore & Munn
HIS ATTORNEY A. W. ERDMAN.
RANGE FINDER.
APPLICATION FILED MAR. 26, 1908.
983,272.
Patented Feb. 7, 1911.
9 SHEETS—SHEET 7.
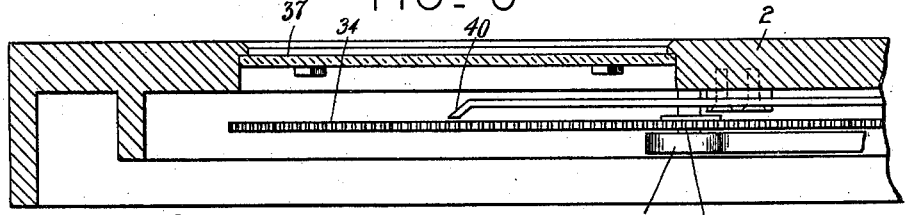
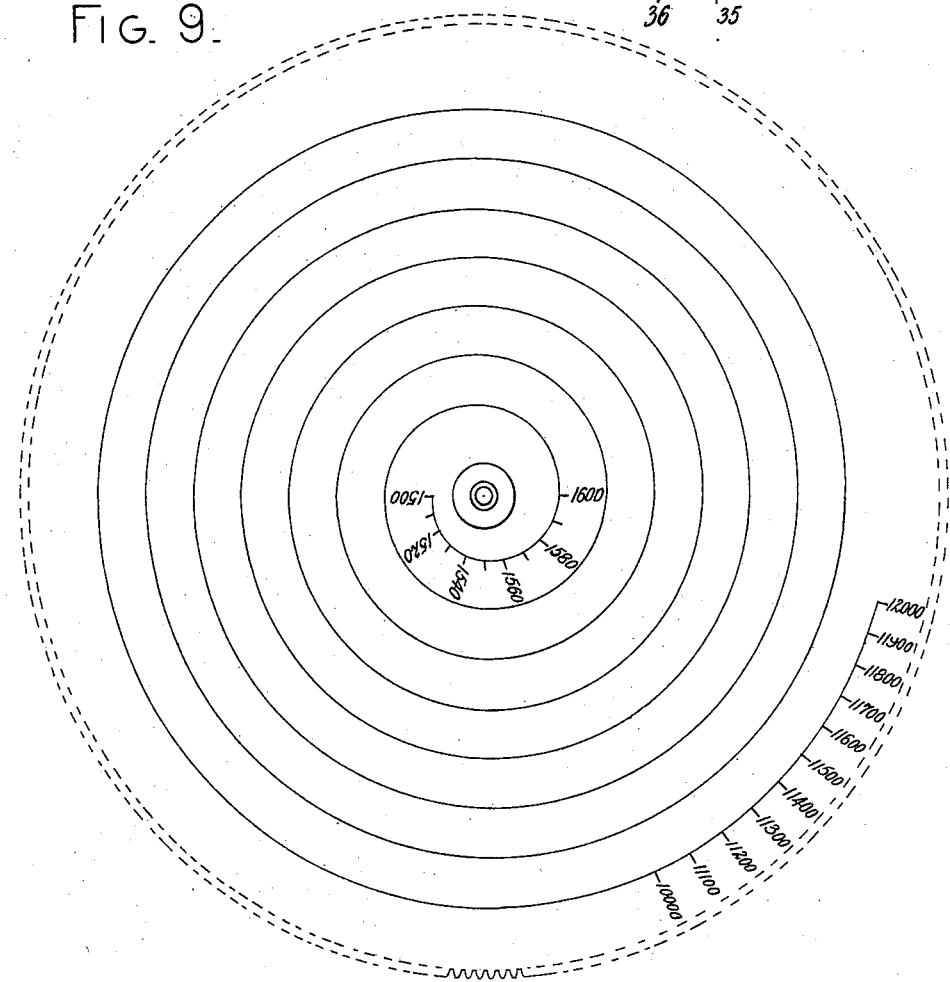
WITNESSES.
INVENTOR.
HIS ATTORNEY A. W. ERDMAN.
RANGE FINDER.
APPLICATION FILED MAR. 26, 1908.
983,272.
Patented Feb. 7, 1911.
9 SHEETS—SHEET 8.
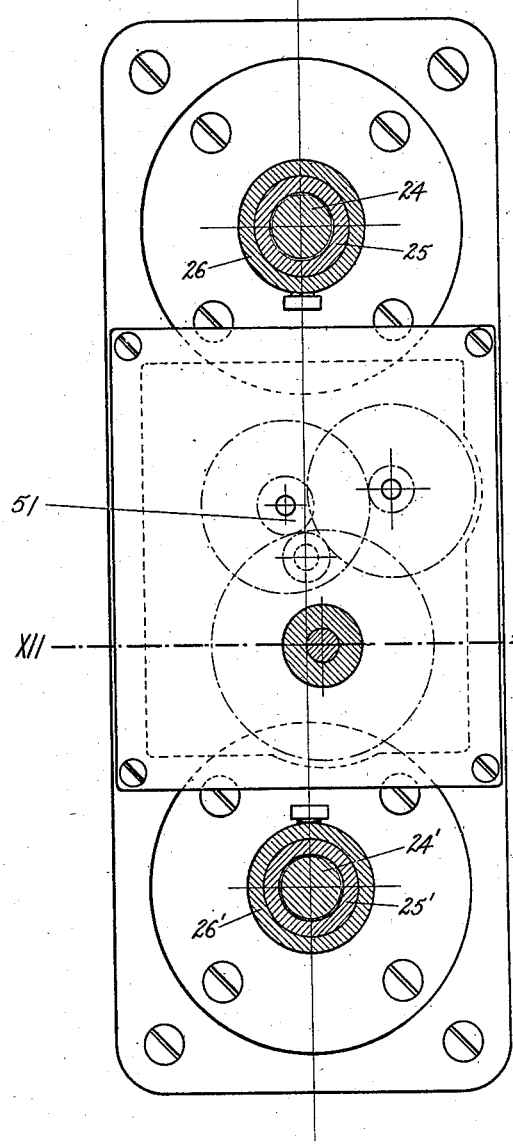
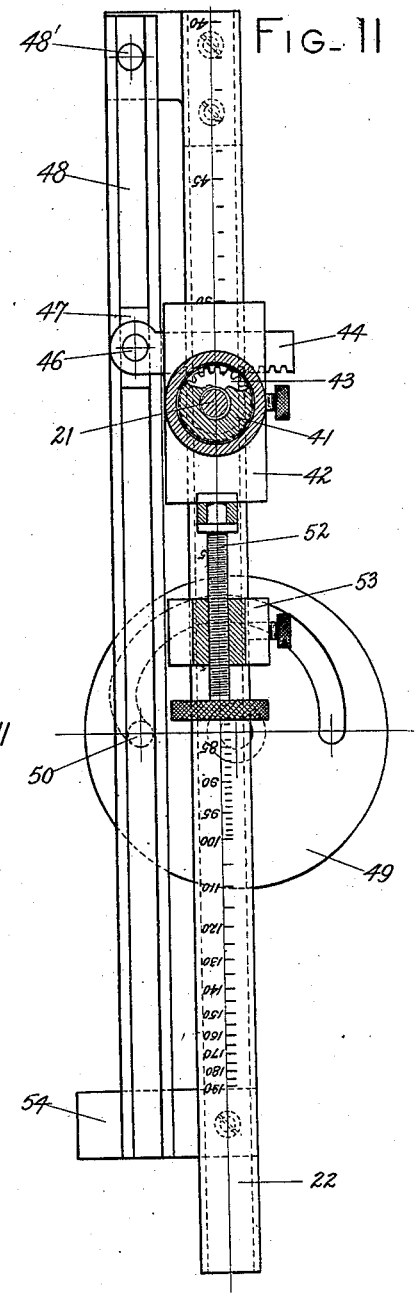
WITNESSES:
INVENTOR:
HIS ATTORNEY

A. W. ERDMAN.
RANGE FINDER.
APPLICATION FILED MAR. 26, 1908.

983,272.

Patented Feb. 7, 1911.
9 SHEETS—SHEET 9.

WITNESSES:

INVENTOR:

HIS ATTORNEY

UNITED STATES PATENT OFFICE.

ALBERT W. ERDMAN, OF WATERBURY, CONNECTICUT.

RANGE-FINDER.

983,272.

Specification of Letters Patent.

Patented Feb. 7, 1911.

Application filed March 26, 1908. Serial No. 423,286.

*To all whom it may concern:*

Be it known that I, ALBERT W. ERDMAN, a citizen of the United States, residing at Waterbury, county of New Haven, and State of Connecticut, have invented certain new and useful Improvements in Range-Finders, of which the following, taken in conjunction with the drawings forming a part hereof, is a full and true specification.

The invention relates to improvements in range-finders and particularly in tangent-screw range-finders, of the kind wherein the angular adjustment given to a vertically tilting telescope, in sighting it at the object whose range is desired, is caused to effect a corresponding actuation of a suitable range scale or indicator from which the appropriate range readings may be directly taken, and the invention aims to improve the accuracy and simplify the construction and manufacture of such instruments, to render them adaptable for use at locations of considerable difference in altitude and especially to compensate automatically for variations in the effect of the earth's curvature on intermediate range readings for all elevations of instrument, to provide means for compensating for abnormal atmospheric refraction which will be reliable for all ranges, and generally to improve the efficiency and facility with which such instruments may be used, all of which will be hereinafter explained and more particularly pointed out in the appended claims.

Figure 4:
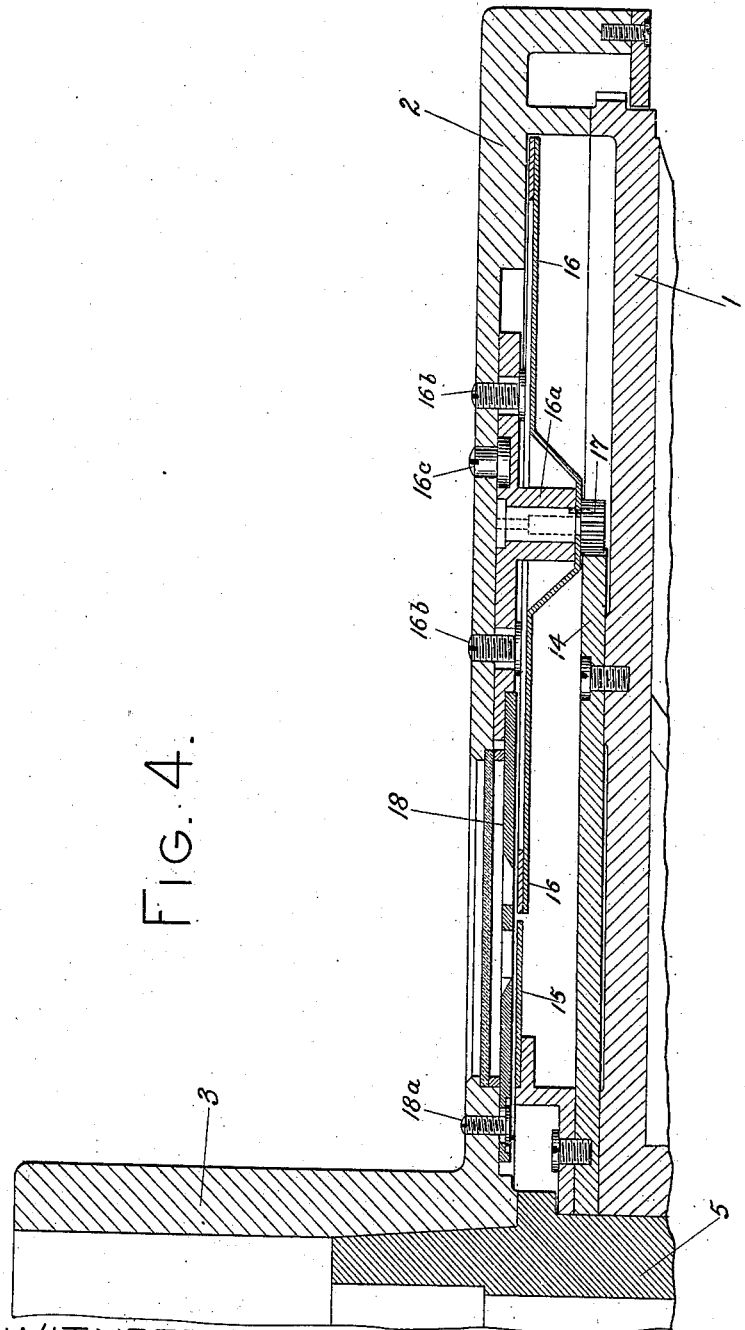
Figure 5:
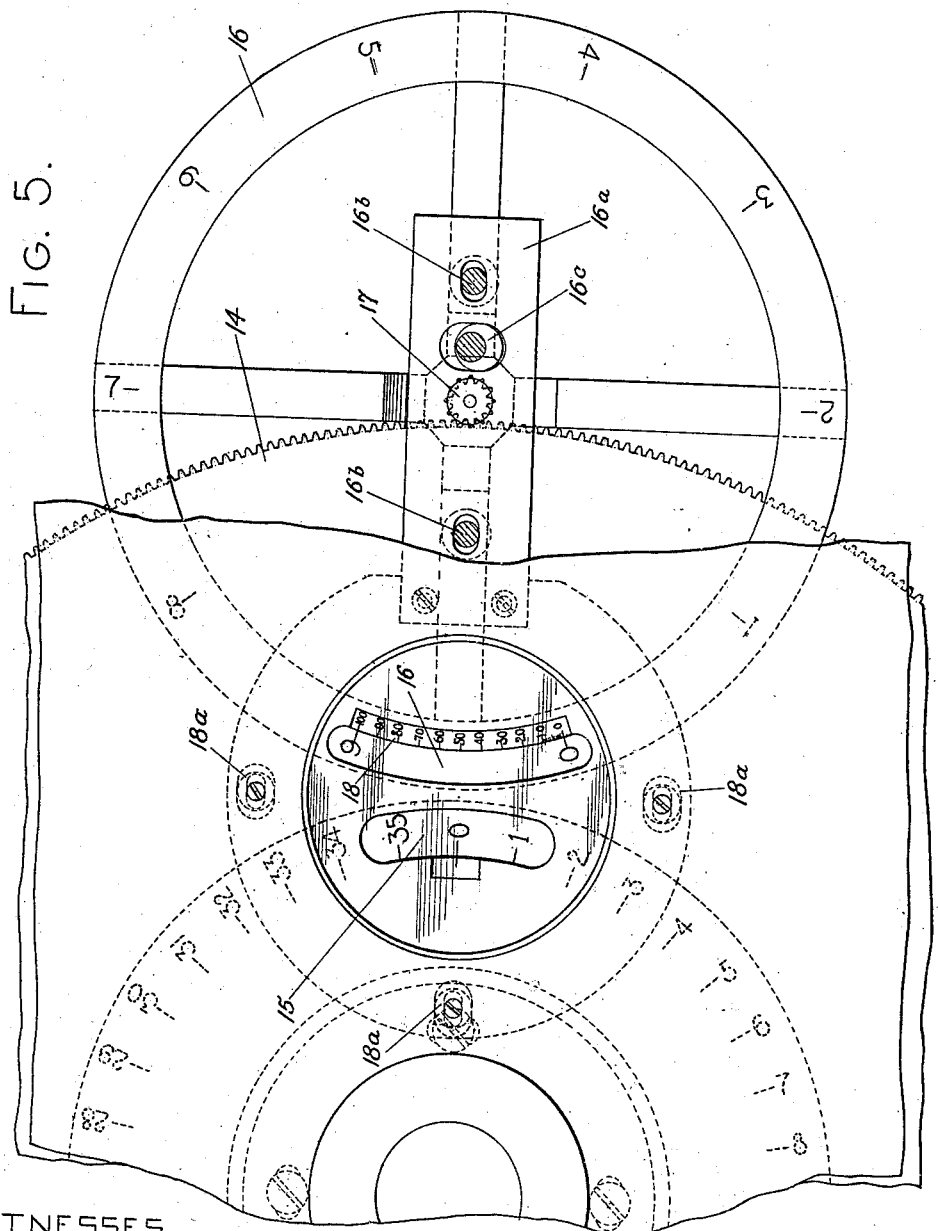
Figure 6:
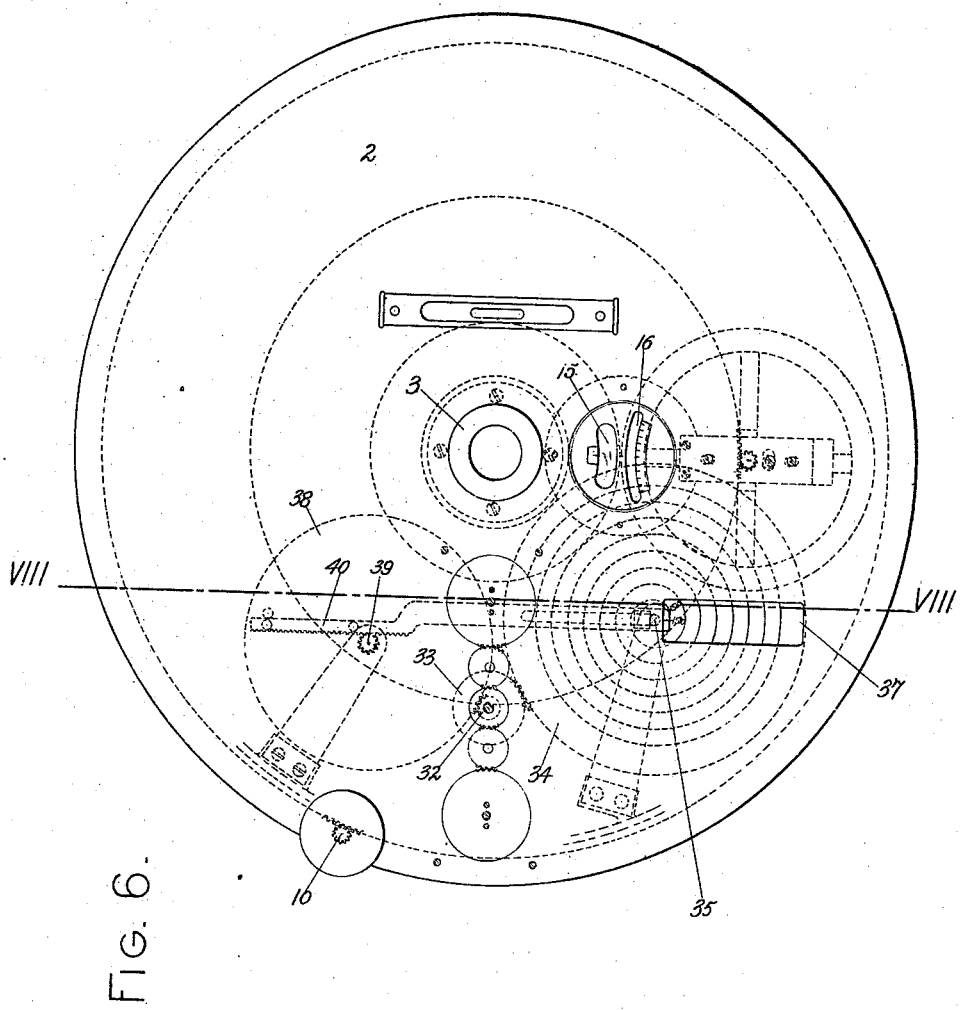
Figure 12:
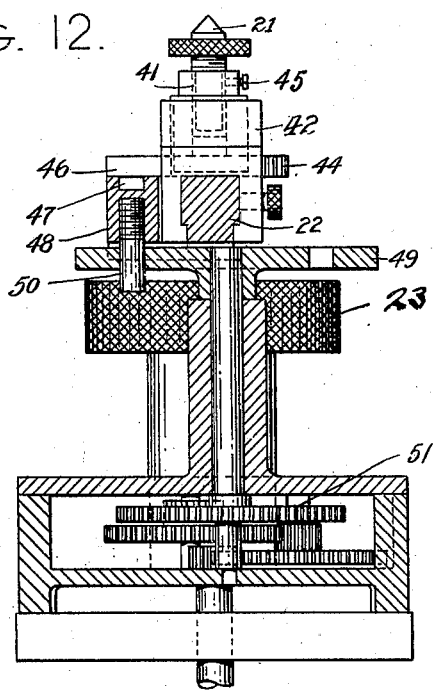
Figure 14:
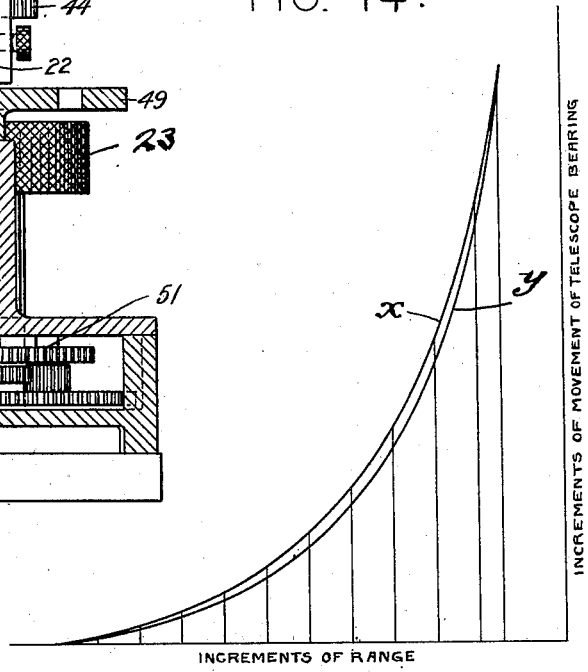
Figure 15:
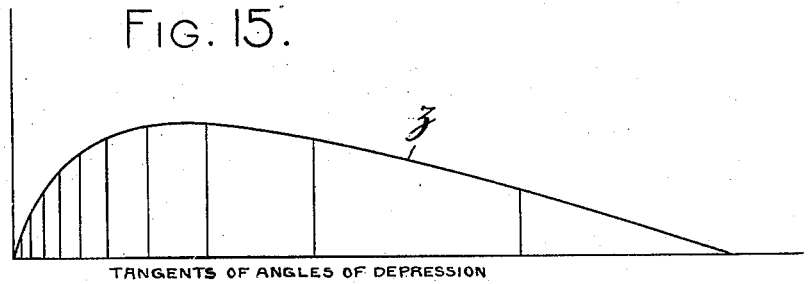

Referring to the accompanying drawings, Figure 1 is a side elevation of a range-finder embodying my invention; Fig. 2 is a vertical central elevation of Fig. 1 showing the azimuth indicating mechanism in section; Fig. 3 is a sectional detail of the bearing plug and socket; Fig. 4 is an enlarged central section of the azimuth indicator; Fig. 5 is a plan of the azimuth indicator on the same scale as Fig. 4 with parts broken away and parts in section; Fig. 6 is a plan view of the rotary table with telescope and tangent screws removed and indicating the gearing of the actuating mechanism in dotted lines; Fig. 7 is an enlarged vertical section of the actuating mechanism in the plane of the tangent screws and with certain parts in elevation; Fig. 8 is a vertical section of the range indicator mechanism on line VIII—VIII of Fig. 6; Fig. 9 is an enlarged detail, in plan, of the range indicator dial; Fig. 10 is a horizontal section through the tangent screws on the line X—X of Fig. 7; Fig. 11 is a similar horizontal section on the line XI—XI of Fig. 7; Fig. 12 is a vertical section on line XII—XII of Fig. 10; Figs. 13, 14 and 15 are diagrams illustrating the principle of operation of the instrument, and later explained.

The support for the instrument comprises a base-plate 1 adapted to be carried on a fixed column or other support and provided with a ball and socket connection, together with appropriate leveling screws whereby the instrument as a whole may be adjusted to true horizontal position. A circular table 2, which carries the telescope post 3, is mounted to rotate upon the base-plate, resting thereon upon a circular track 4 at the periphery and upon the conical head and shoulder of a bearing plug 5 at the center. The plug 5 is contained within the central bore of the base-plate, and is vertically adjustable therein by means of an interior screw-threaded pin 6, which thrusts against the botttom of the bore or against a part of the ball and socket connection therein, as shown. By adjusting the pin 6, the plug may be raised or lowered and the table brought into equal bearing engagement on both its peripheral and its central track, the effect of unequal wear being in this way taken up. Such adjustment may be rendered permanent by means of the three set-screws shown in Fig. 3, which engage longitudinal slots in the body of the plug. The telescope T is carried in a cradle 7 which tilts on trunnions 8 journaled in the forked arms of a post-head 9, the axis of the trunnions being perpendicular to and intersecting the vertical axis of the instrument. The post-head is snugly fitted in the top of the post 3 and turns therewith, being removable, however, in order to afford access to the adjustment screw 6 above mentioned. As thus arranged, the table and the telescope may be rotated on a vertical axis in making observations at different points of the compass and taking or reading the azimuth thereof, and such movement is conveniently imparted to the table by means of the pinion 10 journaled in the table and meshing with a circular rack 11 which is fixed on the base-plate. The rotary table is kept to the base-plate by means of an annular flange 13 extending under the rack 11, and suitable means not shown are provided for locking it in its azimuth adjustment. The space between the base-plate and table forms an inclosure for the tracks and other parts of the mechanism for operating the azimuth and range indicators, as well as for these indicators themselves, as will presently appear.

The azimuth indications, that is to say, the bearing of a distant object with reference to the points of the compass, may be taken directly from the angular position of the table by means of any suitable dial mechanism, and in the present drawings I show a form of azimuth indicator involving a planetary dial which coöperates with a fixed dial to give the azimuth reading to hundredths of degrees at a hasty inspection. The mechanism for this purpose comprises a circular rack 14 and a dial 15 secured in fixed position beneath the rotary table and concentric therewith. The planetary dial 16 carried by the table is driven by a pinion 17 meshing with the circular rack. The degree marks on the edges of the two dials, where most nearly proximate, are visible through a window in the rotary table, where they may be compared with fixed reference indices marked on the window margins, or preferably on the margins of an apertured scale-plate 18 interposed between the window and the dials. The marks on the fixed dial as observed through the window give the integral part of the azimuth reading, while the corresponding marks on the planetary dial by comparison with a fixed scale on the plate 18 give the fractions.

The planetary gearing just described is manifestly liable to wear, and in order to prevent inaccuracy of azimuth reading from this cause, I mount the planetary dial, together with its scale-plate 18, on an adjustable carriage 16ª and provide means for setting said carriage toward or from the axis of the instrument, that is, in a radial direction, as the wear becomes apparent. The carriage is held to the under side of the rotary table by screw and slot connections, shown at 16ᵇ, and an eccentric 16ᶜ is confined in a recess in the carriage, with its shaft projected to the surface of the table where it is screw-nicked to receive a screwdriver or other suitable key. The ends of the screws 16ᵇ are also similarly nicked so that the carriage may be shifted bodily toward and from the center of the instrument and then locked in its adjusted position. The planetary dial and dial pinion, together with the scale-plate 18, are respectively mounted on the carriage so as to be moved by the adjustment thereof, and the margins of the scale-plate 18 are also held to the under side of the cover by slot and screw connections, shown at 18ª, which may also be tightened to set the adjustment. By confining the movement of the planetary parts to a radial direction and simultaneously moving both the dial and the plate 18 which bears the reference scale therefor, the effect of wear may be taken up without disturbing the original setting of the instrument or the fixed relation that is required to exist between the dial and its reference scale. It will be understood, however, that other forms of azimuth indicators may be employed, if desired, with the range indicating mechanism herein described.

The practical limits of distance or range for which instruments of this kind are desired are 1,500 yards minimum range, and 12,000 yards maximum; outside of these limits being regarded, respectively, as point-blank range or farther than it is practicable or possible to fire; and the telescope T is therefore required to tilt on its horizontal axis through such an angular distance as will be sufficient to bring it to bear upon any point between these maximum and minimum limits. Across the field of vision within the telescope there is arranged horizontal cross-hair, not shown herein, but the same as that employed in astronomical and surveying instruments, and the telescope is regarded as properly sighted at a distant object when this cross-hair appears to intersect or coincide with that object. In marine observations the cross-hair is brought into coincidence with the water-line, which is termed water-lining the object. The mechanism for imparting the required movement to the telescope to train it on different objects is caused to effect the simultaneous operation of the range indicator, and the movement imparted to the latter bears certain definite relations to the movement of the telescope, as will be later explained in full, so that the adjustment of the telescope in water-lining any distant object will automatically adjust the indicator dial, through its interconnected gearing, to give the required range with mathematical accuracy.

Figure 13:
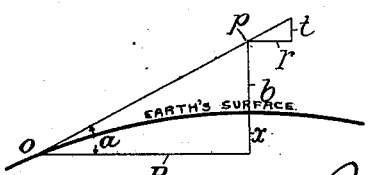

The relations required to exist between the angular movement of telescope and the corresponding movement of the range indicator depend upon the characteristics of variation of the right angle triangle which has its upper acute apex coincident with the tilting axis of the telescope and its other acute apex coincident with the apparent position of the object whose range is desired to be read from the indicator. Such a triangle is indicated in Fig. 13, wherein $o$ is the object, R its range or distance from the instrument, and $p$ the location of the tilting axis of the telescope. The hypotenuses of all such triangles are obviously coincident with the extended longitudinal axis, or line of collimation, of the telescope when trained on the object, and the angle between the line of collimation and a horizontal is termed the angle of depression. This angle is designated $a$ in the diagram referred to, and is the controlling factor upon which the computation of the above relations is based, inasmuch as the value of such angle is determined by the range R or length of the horizontal side of the triangle, which is the unknown quantity, and the length of the vertical side $b+x$, which is known or ascertainable, being the elevation $b$ of the instrument above sea-level, plus a proper compensation for the curvature of the earth and normal atmospheric refraction, $x$. Any of such triangles has a virtual counterpart in the instrument itself, the angle of the telescope with reference to a horizontal line drawn through its tilting axis, being equal to the angle of depression, the side $r$ being proportional to the side $b+x$, and $t$ being proportional to the unknown range R. It may be here stated that the kind of instrument herein described is known in the art as a "vertical base" instrument, and therefore in the comparison just made, the correspondence of the triangles is arbitrarily taken as between non-homologous elements of the said triangle so that $t$, the vertical side, will correspond to the base of the larger triangle, these elements being mathematically proportional, for obvious reasons. Inasmuch as the length of the side $r$, corresponding to elevation and curvature, and the length of $t$ are both determinable quantities in the instrument, the value of the angle of depression for any distant object is therefore ascertainable. The quantities just mentioned, being trigonometrical functions of each other, it follows that the length of $t$ has a different value, according to known laws, for different values of the angle of depression or distance of the object.

The mechanism which tilts the telescope and simultaneously actuates the range indicator is merely a means for indicating the changes in the length of $t$ on a magnified scale, not with reference to the elements of the triangle, but in terms of linear measurement previously computed from those elements, and the indications begin from the length of $t$ when the telescope is waterlined on an object at the minimum range, for example 1500 yards, and read up to the maximum. The same angle of depression or length of $t$, however, does not always correspond to the same range and the conditions which account for its variation are as follows:—First, a difference in the elevation at which the instrument is used, for obviously when set for the same range the telescope must have a greater inclination or angle of depression for a greater altitude, and it should be noted that the actual elevation changes with the ebb and flow of the tide. Thus, referring to the small triangle, the length of $t$ is not merely a trigonometrical function of the angle of depression but also of the side $r$, and hence a change in either requires a corresponding change of the length of $t$. Compensation for such change is effected by preserving the same change in length of $t$ and shifting its location toward or from the vertical axis of the instrument, so that its total change in length will still be sufficient to tilt the telescope from maximum to minimum range inclination, but the tilting movement will now begin and end with a greater or less inclination, that is to say, the length of the side $r$ is changed to correspond to the changed elevation which adapts the instrument as a whole for use at such elevation. Second; a condition which arises from the fact that the adjustment last referred to, while reliable for the maximum and minimum ranges at all elevations, is not accurate for intermediate ranges, except when used at one particular elevation, that elevation being the one for which the range readings of the indicator were computed or originally marked off. This effect is due to the varying effect of the earth's curvature that is to say, to the fact that for any given range, the effect of earth's curvature will be less when the range is taken from a high elevation than when it is taken from a lower elevation and vice versa. This effect is also due to certain mechanical limitations of the instrument, later explained. Finally, the condition of the atmosphere, which, when denser than usual, produces abnormal refraction of the line of sight, with the effect of making the object appear somewhat above its normally apparent location.

The mechanism interconnecting the telescope and range indicator, which I now proceed to describe, when once adjusted or set for the elevation and atmospheric refraction at the time it is used, is functioned to compensate, automatically, for the other variations for all ranges so that when thus properly set the desired range readings may be accurately and quickly ascertained. Referring to the drawings, the eye-piece end of the telescope is provided with a straight-edge bearing-plate 20 by which it rests upon the bearing afforded by the point of a screw 21, and the latter is adjustably supported on a horizontal beam 22, which is adapted to be raised or lowered through minute vertical distances, as presently described, by rotating a thumb-wheel 23. The bottom or bearing surface of the straight-edge 20 is parallel with the line of collimation of the telescope, being conveniently formed as a radius of its tilting axis and represents, in mechanical embodiment, the hypotenuse of the vertical right angle triangle, above described as existing in the instrument, while the angle which the straight-edge makes with a horizontal, such as the horizontal beam 22, is the angle of depression. The path of movement of the bearing 21 represents or corresponds to the side $t$ of the instrument triangle, and the distance of such path of movement from the vertical axis represents the side $r$ of that triangle.

The horizontal beam 22 is supported near its ends upon the heads of two similar vertical tangent screws 24 of slow pitch, say one hundred threads to the inch, and located in the same radius of the instrument at different distances from the center. The nuts 25, 25' of these screws are held against longitudinal movement within their casings 26, 26' by means of the spline screws 27, and are constrained to rotate in the same direction and in unison with each other by means of spur gears 28, 28' at their lower extremities, which mesh with idlers 29, 29', which latter mesh with the gear 30 on the vertical arbor 31. One of the nuts, as 25, is connected to or formed as a part of the operating thumb-wheel 23, above referred to, by means of which the operator adjusts the inclination of the telescope in waterlining distant objects *i. e.* by raising or lowering the beam and its bearing screw. The gears just described may be contained within the inclosure formed by the rotary table 2, but are shown herein as being within a separate casing placed on the top of the table and are hence removable. The arbor 31 penetrates the rotary table and within the inclosure thereof carries two pinions, 32 and 33, of which the larger pinion 33 meshes directly with a dial-wheel 34 (see Figs. 6 and 8), journaled on the stud 35, which stud is carried by the rotary table and likewise in a bracket 36 fastened to the table. The dial-plate is formed on or carried by the dial-wheel 34 and bears a spiral line of any suitable number of convolutions, say eight convolutions (Fig. 9), along which the appropriate range readings are marked off, beginning at the inner end of the line with the minimum range. The table 2 has an oblong window 37 above the dial, through which all parts of the spiral line may be observed as the dial revolves. The other smaller pinion 32 on the arbor 31 drives a large gear 38, also carried by the rotary table (Figs. 6 and 7), and a pinion 39 concentric with this gear drives a rack 40, which rack is supported above the face of the spirally marked dial and coöperates therewith as a pointer for indicating which of the convolutions thereof appearing through the oblong window is to be regarded in reading the range. The rack or pointer is slotted near one extremity, and embraces the stud 35 of the dial-wheel, being thus guided to move radially with respect to the dial, and at its extremity it is provided with an index mark or other suitable reference device. The gear ratios of the dial mechanism are such that the dial makes as many revolutions as it has convolutions of spiral, while the nuts of the tangent screws 24 are being turned a sufficient number of revolutions to give the bearing-screw 21 its complete vertical movement, that is to say, while the length of $t$ is changing from its minimum length, corresponding to maximum range, to maximum length, corresponding to minimum range, and the movement of translation of the pointer is such that the reference device on its extremity follows the spiral from end to end. Thus any position of the tangent screws or vertical height of beam 22 with reference to the table has a corresponding position of dial and pointer, and this relation is a fixed one, determined by the ratio of the gears just described. The necessary variation in the relation between the telescope and range dial, in order to compensate for the conditions of change above explained, is brought into effect by mechanism that alters the position of the bearing upon which the telescope rests, with reference to the horizontal beam. The said beam, representing the mechanical embodiment of the side $r$, is marked with an elevation scale and the telescope bearing or screw 21 carried in a block 42 slidable on the beam, is adapted to be shifted along the same until its position coincides with the scale mark corresponding to the elevation at which the instrument is to be used. The subdivisions of the elevation scale are measured with reference to the center of the instrument, the scale being a tangent scale computed for different elevations from the formula $$r \text{ (distance along beam from center)} = \frac{C \text{ (total vertical movement of bearing point)}}{\tan. B - \tan. a}$$

where B is the angle of depression at minimum range and $a$ the same for maximum range, this formula being solved for the maximum and minimum depression angles, for each elevation desired to be marked on the scale-beam. When the bearing is thus adjusted in accordance with the elevation the small triangle of the instrument is brought into conformity with the actual larger triangle of which the desired range constitutes the base.

Inasmuch as the altitude of the location at which a range-finder is to be used is not conveniently known before its construction, it is a point of material advantage for each instrument to be capable of considerable adaptability in this respect. By providing two or more tangent screws as the support of the scale beam and interconnecting the nuts of said screws to rotate in unison, the beam may be made as long as consistent with the size of the instrument and its scale may cover a wide range of elevations. By the nature of the support thus provided, the beam becomes practically free from flexure such as might give rise to errors in indication, and at the same time such inequalities or lack of uniformity as might possibly exist between the pitch of the tangent screws are averaged in their effect upon the movement of the bearing-screw by the length of the beam. A further adaptability is obtained by the employment of the interconnecting gears which may be supplanted by gears of different ratio when it is desired to alter the relation between beam movement and dial.

The bearing-screw 21 is supported on the slide-block through the intervention of its nut 41, which latter is movably held in a recess of the slide-block, being provided with external threads of slow pitch, say one hundred per inch, engaging corresponding internal threads in the slide-block. The nut is further provided with gear-teeth 43 cut in its lower extremity, and a rack 44, confined to slide through an appropriate channel in the slide-block transversely to beam 22, meshes with these teeth so as to turn the nut within the recess, thereby screwing it slightly up or down in accordance with the actuation of the rack. A small friction screw 45 carried by the nut 41 and abutting against the threads of the bearing-screw 21, preserves the relative position of the said bearing-screw and nut, constraining both to move together except when otherwise desired. The rack 44 is connected by a stud 46 to an auxiliary slide-block 47, which latter is movable along the lever 48 in unison with the movement of the main slide-block 42 along the beam. The lever 48 is supported by the tangent screws so that it moves with the beam, being fulcrumed at 48' at a fixed point with reference thereto and adapted to swing through a limited arc in a horizontal plane. A horizontal cam 49 located beneath the beam engages a depending cam-pin 50 on the lever 48, by which the latter receives its said movement. The cam is driven from the arbor 31 above described, through a train of reducing gearing, designated generally by 51 and not requiring detailed explanation further than to say that in the case in hand the cam revolves through a half revolution as the beam makes its complete vertical traverse, although with a different proportioning of other movements, it could be given a greater or less rotation. The slide-block 42 is provided with a traverse screw 52, with its nut 53 capable of being adjustably fixed to the beam whereby the block may be readily moved for minute adjustments on the scale.

The compensating mechanism whereby the instrument is rendered accurate for intermediate ranges for all elevations comprises the cam 49 just described and its connected gearing for raising and lowering the nut 41 of the bearing-screw 21, the immediate object of such mechanism being to accelerate the vertical movement of the bearing-screw with reference to that of the tangent screws during a portion of its vertical traverse and to retard it during the remainder thereof.

As before stated, the necessity for the change in the relation between the length of $t$ and the range dial, under certain conditions, is due to the earth's curvature, which may perhaps be best appreciated by reflecting that the effect of the earth's curvature varies with the height from which the object is viewed, being *nil* from an infinite height, and being more pronounced for long than for short ranges. The actual effect of such curvature as between a long and a short range also is different for different elevations, all of which can be mathematically demonstrated. At the same time, the range indicator dial for obvious mechanical reasons is a permanent scale which must be serviceable for all conditions with accuracy. The scale on the range dial is computed from the small instrument triangle above referred to and with reference to any given elevation, taking into account the effect of the earth's curvature at that elevation and also normal refraction; or it may be empirically derived by water-lining objects at successively greater known ranges and marking the spiral dial line accordingly, which will, of course, produce the same effect. When thus determined and used, the movement of the dial will bear a fixed relation to the movement of the telescope, *i. e.* to changes in length of $t$, and any length of $t$ will have a corresponding and true range reading indicated on the dial, no compensation being required for that elevation. When, however, the elevation is changed, the relationship is no longer fixed and an instrument in which the movement of the dial has a constant relation to the telescope movement would be found to be inaccurate, even though properly adjusted to the new elevation by sliding the block 42 on the horizontal beam as above described. The subdivisions of the beam scale were computed, as before stated, from the difference of the angles of depression at maximum and minimum ranges and consequently the adjustment of the slide-block on the said scale will be accurate for the maximum and minimum ranges at the new elevation or any elevation. The error is thus confined to the intermediate range points, being most appreciable at central range points, and being generally a greater error as the new elevation is higher or lower than the one for which the dial scale was computed.

The rate at which the error increases toward and decreases from the central range point is capable of mathematical expression and I have represented such rate of change in the form of a curve plotted in the manner described below, and have formed this curve on the cam 49, which, as above described, controls the position of the bearing-screw 21 relative to the scale beam. This cam holds the horizontal lever 48 parallel with the scale beam at the extremities of its cam slot, which positions represent maximum and minimum range positions of the actuating mechanism, and the rack bar 44 and nut 41 are in their neutral positions at these points, no compensation being required, as above explained. Rotation of the cam, as by operating the actuating mechanism, however, swings the lever one way or the other and either adds to or takes from the movement imparted to the screw by the scale beam, performing this function at the rate determined by the cam's curvature. While the character of this correction, as I have found, is constant, the extent to which it is made effective on the instrument requires to be adapted to the elevation, because the error or deviation from true range indication increases materially as the change in elevation increases. For this purpose an element of the connecting gearing between the cam and the bearing-screw, namely the lever 48, is arranged to impart a variable extent of movement to the bearing screw or its nut 41, dependent upon the elevation adjustment of the latter, i. e. upon the position of the slide-block on the horizontal scale beam. The point chosen for the fulcrum of the lever 48 is determined by the scale beam, being the point thereon which represents the elevation for which the dial scale was computed and for which no compensation is required, because when the slide-block 42 is adjusted to this point, the stud 46 of the rack 44 coincides with the fulcrum 48', and the rack and nut receive no movement from the lever. But as the slide-block is moved in either direction from the fulcrum, corresponding to lower or higher elevations, the rack begins to receive a movement from the lever, increasing with the adjustment of the block, thereby offsetting the increase in the error that would otherwise be present. I have ascertained that the error or deviation from true range indication is directly proportional to the linear changes in the elevation adjustment of the slide-block along the scale beam, which fact permits the employment of the lever just described, inasmuch as the amplitude of its movement is directly proportional to similar changes. The pitch of the threaded connection between slide-block and the nut, as well as the diameter of the gear 43 engaged by the rack, are fixed with relation to the throw of the cam, so that the available movement of the lever will produce the appropriate change in the length of $t$. Conveniently, the movement ratios of these parts are determined for an elevation at which the slide-block occupies a position on the scale beam where the stud 46 coincides with the cam-stud 50. At this point the rack moves uniformly with the throw of the cam and the mechanical relations are merely a proportional reduction of movement, or, the values of the screw-thread pitch and gear diameter having been selected, the proper mechanical relation may be established by adjusting the position of the cam with respect to the fulcrum 48', i. e. the length of the "power arm" of the lever.

By bringing the curve of error directly into the instrument as the controlling element of the compensating mechanism, I am enabled to take advantage of the gearing between it and the bearing-screw and to make the cam or curved member on a sufficiently large scale to insure its practical mechanical accuracy and then reduce the movement imparted by it to such an appropriate extent as that any possible error in the cam, due to variations in the material or tools or its mechanical measurements, will be so diminished in effect on the nut as to be untterly negligible. In point of fact, the reduction of movement as shown in the drawing, is so great that particular precision in cutting the cam is not necessary. Depending upon the elevation for which the dial scale has been computed, the fulcrum 48' may be located at any point along the scale beam, because changes in elevation below the point to which the computed elevation corresponds, will require compensation of opposite character to those above the computed point and the rack will thus require to be moved in an opposite sense. Herein the fulcrum is shown at one extremity of the beam and the free extremity of the lever is shown as supported on a flat shelf 54 upon which it may move freely under the action of the cam.

The appropriate contour of the cam, for accomplishing the object of this invention, is found by first plotting the curve of the relationship between successive increments in the elevation of the bearing screw and corresponding increments of the range, assuming the elevation to be that for which the range scale is to be computed, or corresponding to the location of the fulcrum 48' on the scale beam. This curve, shown at X (Fig. 14) may be determined by ordinates representing the movement of the bearing screw from minimum to maximum range position, and by abscissas representing the range from maximum to minimum, and is the curve of the relationship which is desired to exist between telescope and dial for all conditions. A second curve Y is then plotted of the same functions and using the corresponding ordinates and abscissas but based on a different elevation adjustment or value of $r$. The two curves, when superposed, will register at their extremities while deviating at their intermediate points, and a comparison will illustrate the character of the departure from accuracy, such as would be present if the instrument were used at the different elevation without compensation. A third curve Z is then plotted whose ordinates are proportional to the differences of the ordinates of the first and second curves and whose abscissas are the tangents of the angles of depression for the elevation of the dial scale. This curve when developed on a circumference is the curve of the cam 49 and represents the character of change which must be impressed on the movement of the bearing-screw to make the dial readings conform to the angles of depression of all ranges between maximum and minimum at all elevations. The third curve is plotted on a scale corresponding to the size desired for the cam, whereby inaccuracies in measurement are diminished by the reduction gearing as above explained.

It is to be noted that the major part of the effect of the earth's curvature is already taken into account, when the scale divisions of the range indicator are determined so as to be correct for all ranges at a certain definite elevation, as above stated, whether such divisions are determined by mathematical computation or actual observations. The compensating mechanism above described has therefore but to correct for such remaining effect of curvature as may be due to differences in elevation above or below that given elevation for which the curvature is allowed. Thus, in any event, the compensation required is confined to small amounts and the liability of error in the changes made, is correspondingly minimized. This feature, especially in conjunction with the variability of compensation afforded by the slide-lever 48, renders the instrument as a whole extremely accurate for all ranges and at all elevations within the scope of its elevation scale.

Referring now to the effect of abnormal atmospheric refraction, the compensation made on this account, as determined by observing a datum point of known range, should hold as true as possible for other ranges. I have ascertained that this effect of abnormal refraction is proportional to the square of the range, and provide a means of correction therefor which varies with the movement of the actuating mechanism in a similar manner. By using the traverse screw 52 the slide-block, previously adjusted to the proper elevation on the scale beam, may be further adjusted minute distances thereon which gives the telescope a slight additional tilt without, however, affecting the range dial, which, of course, is moved only by actuation of the tangent screws. The additional tilt given in this manner to the telescope and sufficient to correct for refraction at the range of the datum point is found to follow substantially true for other ranges. Thus by adjusting the traverse screw 52 and bearing-screw 21, so that the range indication is true for a known range both for elevation and refraction, the instrument may be used for any range indifferently, giving accurate range readings, so long as the conditions remain unchanged.

Having described my invention, what I claim and desire to secure by United States Letters Patent is:—

1. A range finder having a vertically tilting telescope, a range indicator and interconnecting gearing between said parts having a movement ratio suited to give correct range readings at maximum, minimum and intermediate ranges, for a definite elevation of instrument, in combination with mechanism comprising a curved surface adapted to superadd a predetermined variation upon said movement ratio, the curve of said surface being the error curve of the range indications given by the instrument if no such variation were impressed upon the aforesaid movement ratio.

2. A depression range finder comprising a telescope and connected range indicator having the divisions of its range scale proportional to the relative values of the tangents of the angles of depression of said telescope for a predetermined elevation of the instrument, in combination with a curved surface adapted to affect the relationship of the movement of said telescope and indicator to compensate for the differences in said tangent values for a different elevation.

3. A depression range finder having a telescope and a range indicator suited to give accurate range indications at maximum and intermediate ranges for a definite elevation and having a predetermined movement ratio between itself and the telescope, in combination with automatic mechanism for compensating for the effect of a departure from the said elevation for which the indicator was computed.

4. A depression range-finder having a range indicator suited to give accurate range indications at maximum and intermediate ranges for a definite elevation, and having a predetermined movement ratio between itself and the telescope, in combination with automatic mechanism, controlled by the adjustment of the instrument for altitude and adapted for compensating for the effect of a departure from said definite elevation.

5. A depression range finder, having a telescope and having its elevation scale computed from the difference in the values of the angles of depression at maximum and minimum ranges, and having its range indicator computed to give accurate range indications for all points within the limits of range at a definite elevation and provided with compensating mechanism adapted to compensate in the movement of said indicator for a departure from said definite elevation.

6. In a depression range finder having a telescope and range indicator, a rotary cam adapted to vary the relation between the telescope and range indicator, and being effective thereon through a train of reducing gearing.

7. In a depression range finder, a telescope and range indicator provided with interconnecting gearing whereby the latter is moved in a definite or predetermined ratio to the movement of the former, said gearing comprising an elevation-scale beam, a swinging lever associated therewith, a telescope-bearing adjustable along said beam and lever and provided with means operated by said lever for changing the vertical relation of said bearing to its support.

8. In a depression range-finder, a telescope and range indicator provided with interconnecting gearing whereby the latter is moved according to a predetermined ratio with the former, said gearing comprising a vertically moving beam, a lever associated therewith, a telescope-supporting bearing adjustable along said beam and lever and provided with means operable by said lever for changing its relative position with respect to said beam, in combination with means for actuating said lever to effect a variable change in the position of said bearing.

9. In a tangent-screw range finder having a telescope pivoted on a fixed horizontal axis, range indicator and interconnecting gearing for moving the latter according to a predetermined ratio with the former, the combination with said gearing and means for adjusting for elevation, of a lever adapted to control the relative positions of said telescope and indicator and functioned to effect a variable control thereof in accordance with the elevation adjustment of the instrument.

10. In a depression range finder, mechanism for compensating for the effect of earth's curvature for different ranges at different elevations, comprising a telescope-supporting bearing and a beam supporting the same, having movement parallel with itself in combination with a cam and connections therewith for changing the position of said bearing with respect to its support.

11. In a depression range finder, means for tilting the telescope thereof, comprising a beam, a telescope-supporting bearing shiftable thereon, in combination with a plurality of supporting means for said beam, means for imparting simultaneous movement to said supporting means and a range indicator adapted to register said movement.

12. In a depression range finder, a telescope-supporting beam, two tangent screws supporting said beam at opposite ends, gearing interconnecting said screws and adapted to move them in unison, and a range indicator connected to register the movement thereof.

13. A depression range finder, comprising a beam, two vertically moving supports therefor and a range indicator connected for operation by said supports, in combination with an adjustable telescope-bearing carried by said beam between the said supports therefor.

14. In a depression range finder, a vertically moving member, and a telescope-supporting mechanism adjustable longitudinally thereon, in combination with means co-extensive with said member for variably affecting the said mechanism and a traverse mechanism for adjusting said supporting mechanism simultaneously with respect to both said member and means.

15. In a depression range finder a vertically movable member and a telescope supporting mechanism adjustable horizontally thereon, in combination with means horizontally co-extensive with said member for variably affecting the said member.

16. In a range finder, a base having a table mounted thereon to rotate upon an outer peripheral track providing a dust-tight chamber between said base and table, in combination with a telescope carried by the table, means for tilting the telescope and a range indicator within said chamber adapted to register the movement of said telescope.

17. In a range finder or like instrument, a horizontal base member, a table superposed thereon, central and peripheral tracks between said parts rotatably supporting said table on the base member, and means for vertically adjusting the bearing face of one of said tracks.

18. In a range finder or like instrument, a base, a table rotatable thereon and provided with a central aperture, a bearing-plug within said aperture supporting said table, adjustably secured to the base, in combination with a peripheral support for said table.

19. In a depression range finder, a tilting telescope, two tangent screws and gears respectively therefor, an intermediate gear connecting said first mentioned gears and a range indicating mechanism connected with said intermediate gear.

20. In a range finder or like instrument having a base, a rotary table and means for registering the relative angular positions of said parts, comprising a rack, a planetary dial engaged thereby and a reference plate for said dial, in combination with a carriage for said dial and plate and means for adjusting said carriage toward and from the rack to take up wear.

21. In a range finder or like instrument having a base, a rotary table and means for registering the relative angular positions of said parts, comprising a circular rack, a planetary dial engaged thereby in combination with a carriage for said dial and providing for the adjustment of said carriage on a radial line toward and from the said circular rack.

In testimony whereof, I have signed my name to the specification in the presence of two subscribing witnesses.

ALBERT W. ERDMAN.

Witnesses:
H. G. KIMBALL,
A. A. LORZER.